_United States Patent Office_

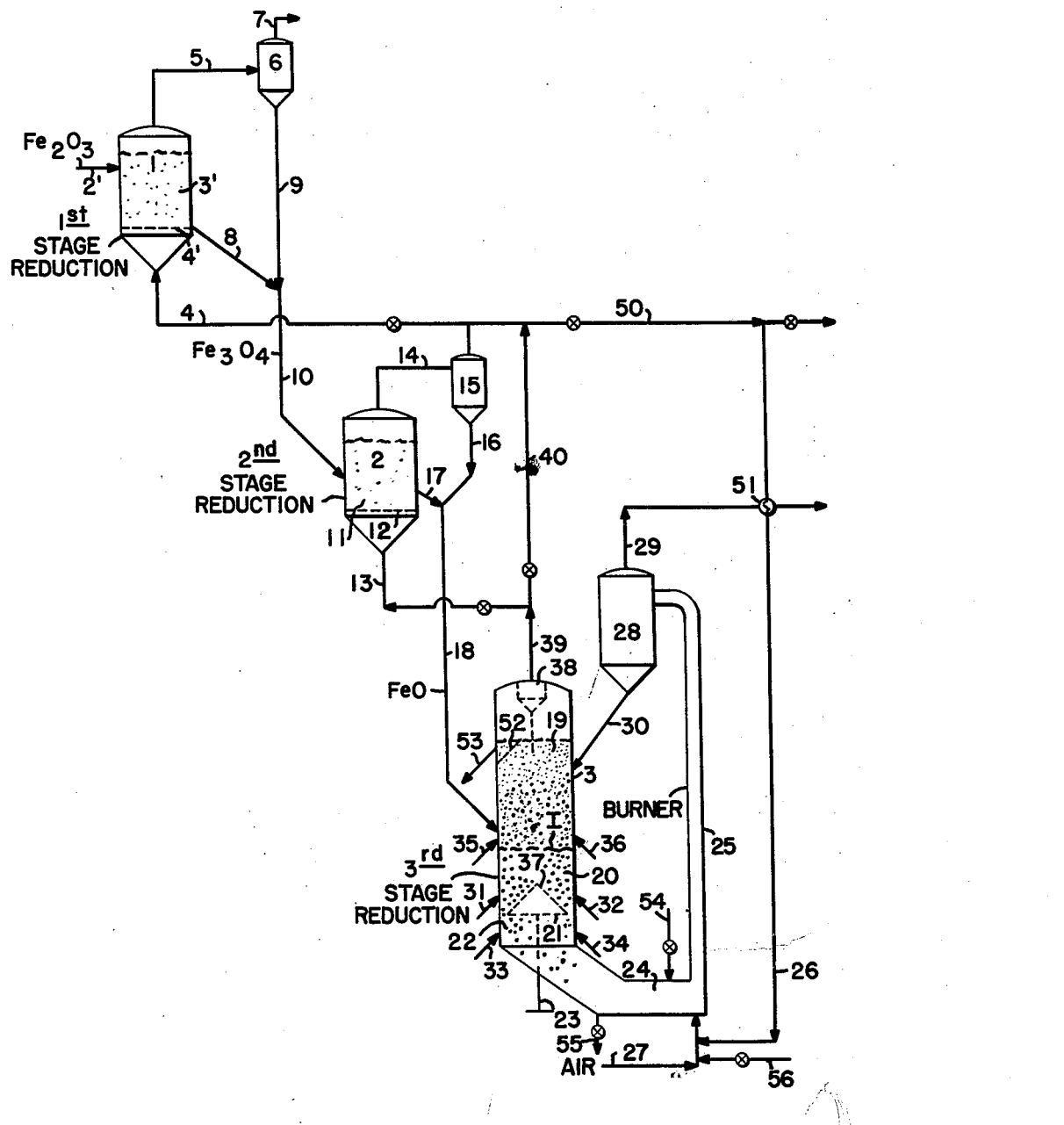

3,079,248
Patented Feb. 26, 1963

3,079,248
DIRECT REDUCTION OF FERROUS OXIDE
Warren K. Lewis, Newton, Mass., assignor to Esso Research and Engineering Company, a corporation of Delaware
Filed Aug. 10, 1960, Ser. No. 48,774
9 Claims. (Cl. 75—26)

This invention relates to a process for reduction of iron oxides and particularly ferrous oxide fines using a coarse heat carrier for supplying heat to the ferrous oxide reduction zone. It is also concerned with the use of gaseous hydrocarbons and $H_2$-rich partial decomposition products of the hydrocarbons converted with the aid of the carrier for reducing the ferrous oxide in a fluidized solids bed.

In efforts to use gaseous hydrocarbons for direct reduction of ferrous oxide a number of problems have been encountered. The reduction of FeO to Fe has the most difficult requirements to meet with regard to heat input and composition of the reducing gas in maintaining a reduction temperature in the range of 800° to 950° C. One difficulty in using gaseous hydrocarbons preheated to supply heat for the reaction arises from a tendency of the hydrocarbon to crack and form carbon, as when the gaseous hydrocarbons are heated to above 600° C. Another difficulty is due to the formation of a reduction-resistant oxide scale on the iron particles caused by localized concentrations of oxidizing gases, such as $O_2$, $CO_2$, and $H_2O$.

In accordance with the present invention a necessary increment of heat is supplied to a fluidized ferrous oxide-iron fines reduction zone by direct heat transfer from heat-carrier solids which are made to fall as dispersed coarse solid particles down through a bed of finer ferrous oxide and metallic iron particles, termed fines, and then are accumulated immediately below the fluidized fines as a lower moving bed of carrier suitably free of metal and metal oxide fines. Since the heat carrier particles have to be separated from the fines and reheated in an oxidizing combustion zone for recycling, it is important to obtain a good separation of the carrier particles from the fines.

A particular advantage is obtained in using the coarse carrier for aiding the partial decomposition of gaseous hydrocarbon to form hydrogen and coke deposits on the carrier or for aiding partial oxidation of the coke deposits to CO in the separated bed of the carrier. After the carrier is separated from the fines, it is reheated for recycling into the fines bed, and, thus, the Fe fines are prevented from undergoing oxidation which would cause formation of the reduction-resistant oxide scale. The carrier separated from the fines as an adjacent moving bed serves to preheat the gaseous hydrocarbon to the FeO reduction temperature, e.g. about 800° to 950° C., promote partial decomposition of the gaseous hydrocarbon, premix the thus formed gases, while protecting the fines from oxidation.

The heat carrier at an elevated temperature functions to give the desired direct and uniform heat transfer to the fluidized fines when introduced near the top of the bed of fluidized fines but below the fines draw-off and made to fall dispersed or distributed through the bed of fines which are in turbulent motion of fluidization. The fines, mostly Fe, are drawn-off free of the coarser carrier particles.

The term "turbulence" signifies random motion which gives complete mixing. In a moving bed there is no substantial turbulence. Each carrier particle in a moving bed may vibrate somewhat but retains its average position relative to neighboring particles while all the carrier particles move downwardly as smoothly as possible. Back-mixing which is characteristic of turbulent flow of fluidized fines is avoided at the interface of the moving bed of the coarse carrier particles with the superposed fluidized fines.

Although there are complexities in having the carrier particles settle through a fluidized bed of fines to form a subadjacent moving bed freed of fines, such an operation has been fully demonstrated. It has been shown that an effective separation of the fines from the carrier can be secured by having the top layer of the moving bed of carrier maintained as a steady, nonsurging mass having a horizontal level interface with the bottom of the fluidized fines bed. This top layer of the moving bed forms a perfect base for the fluidized bed, not only eliminating surging effects which give rise to channeling but also preventing entrapment of fines by the carrier particles falling into the top layer of the moving bed. The gas rising into the fluidized bed from the moving bed is uniformly distributed. It is necessary that the gas be uniformly distributed in passing up through the top layer of the moving bed at the interface with the fluidized fines bed and be at a velocity below that at which turbulence is created in this top part of the moving bed.

It is very desirable that the coarse carrier particles be discharged continuously at a uniform rate from the bottom part of the moving bed to maintain the top level interface in a fixed horizontal plane.

To aid in uniform continuous discharge of the coarse particles from the bottom part of the moving bed, it is helpful to have a uniform annular discharge opening and to use a type of valve which prevents bridging of the moving bed particles.

To have the gas passing up through the moving bed without causing turbulence in the upper part of the moving bed and at the same time provide sufficient upward gas flow through the fines bed, it is advantageous to introduce additional gas into a bottom part of the fluidized fines bed but at a distance above the interface of the fines bed with the moving bed. In this way a substantially higher gas velocity is passed through the fines bed controlled to permit settling of the carrier but at the same time creating turbulence of the fines. The gas passing through the upper layer of the moving bed should be at a velocity below the critical mass velocity with respect to the moving bed particles. This critical mass velocity is a measurable characteristic expressed as the mass of gas flowing upward per unit of time and per unit area of total cross-section of the bed of specified solids. As the critical mass velocity is approached and just surpassed fluidization starts to occur in an erratic manner which gives rise to surging. Surging can thus be created by fixed solid obstacles at the interface and by variations in the horizontal cross-section area of the interface. Therefore, it is necessary to avoid having at the interface fixed solid objects substantially larger than the coarse particles which would deflect the flow of gas and it is desirable to have the same cross-sectional area or diameter in the moving bed and in the fluidized bed for a distance below and above the interface. The present method of using the heat carrier is particularly adapted for the direct reduction of FeO fines to Fe fines for supplying uniform heat requirements, gas mixing, and controlled gas composition requirements needed to prevent excessive carbon deposition, and oxide film formation.

A description of a method embodied will be made with reference to the drawing attached to and forming part of this specification. The drawing illustrates schematically a three-bed fluidized solids system devised for reducing the higher iron oxide to FeO and for reducing the FeO to Fe, the FeO to Fe stage involving the use of the heat carrier.

The $Fe_2O_3$ may be obtained from various iron ores, e.g., hematites or limonites. Some of the ores may best be given a prior upgrading or beneficiation. Others only require drying and screening. An initial ore preheater may be used.

In the drawing the three reducing vessels are numbered 1, 2, and 3. The finely divided $Fe_2O_3$ is passed into the fluidized bed of fines which are largely $Fe_3O_4$ in composition. The rate of reduction in vessel 1 is very rapid at about 800° to 900° C. and the $Fe_2O_3$ is introduced from line 2' at a rate which maintains the composition of the fines in the bed 3' above the grate or distributor 4' close to an $Fe_3O_4$ composition. The reducing gas which acts as fluidizing gas enters vessel 1 from line 4. Spent reducing gas is taken overhead from vessel 1 by line 5 to entrained-fines cyclone separator 6. The separated gas is withdrawn from cyclone 6 by line 7 and may be used as a heating fuel. $Fe_3O_4$ fines withdrawn from vessel 1 through line 8 and separated fines withdrawn from separator 6 by line 9 are passed through line 10 to the second reducing vessel 2 which contains a fluidized bed of fines 11 supported on distributor 12.

In the second reducing vessel 2, the fluidized fines are made to have a composition close to FeO by regulating the inflow of $Fe_3O_4$ from line 10 in accordance with the rate of reduction from reducing gas entering vessel 2 from line 13. In this vessel the reduction rate is fast at temperatures in the range of 800° to 900° C. with the reducing gas containing as much as 1 part $CO_2$ to 0.1 part CO. The partly spent reducing gas taken overhead from vessel 2 through line 14 to the cyclone separator 15 may contain sufficient CO and $H_2$ in proportion to $CO_2$ and $H_2O$ for use as a reducing gas in vessel 1 and is sent thereto by way of line 4. Separated fines are withdrawn from cyclone 15 by line 16 and fines of predominantly FeO are withdrawn from bed 11 by line 17 to be sent through line 18 to the fluidized fines bed 19 Fe and FeO fines in the third stage reducing vessel 3.

In the fluidized fines bed 19 the composition of the fines is made to have an Fe content in the range of 75 to 95 wt. percent by the regulated introduction of FeO fines, removal to Fe—FeO fines, and the rate of reduction. The rate of reduction of the FeO to Fe is relatively slow compared to the reduction of the higher oxides and is sensitive to the concentration of the oxidizing gases, $CO_2$, $H_2O$, and $O_2$. To keep the throughput high and steady with suitable fluidization by gas in the FeO to Fe reduction a number of controls may be used in combination.

The fines fed to vessel 3 should have a composition close to FeO. This means that nearly all the $Fe_3O_4$ is reduced to FeO in the previous fluid bed stage. In the fines bed 19 the temperature must be kept sufficiently high to permit faster reaction, e.g., a temperature in the range of 850° to 950° C. The reducing gas should be high in concentrations of reducing components, e.g., $CH_4$, $H_2$, and CO, and low in oxidizing components, such as $O_2$, $CO_2$, $H_2O$. To meet these requirements, the construction of the FeO reducing vessel 3 and its operation are as herein prescribed.

Vessel 3 is made of suitable height and diameter to contain the fluidized fines bed 19 and the lower moving bed 20 of coarse heat carrier particles, with their interface located where there is no substantial change in diameter of the vessel for a distance above and below the interface. This interface I between the base of the fines bed 19 and the upper layer of the moving bed 20 is a nonsurging horizontal level.

The carrier particles are discharged from the bottom of the moving bed 20 through an annular space between the perimeter of the cone valve 21 and the wall of the vessel 3 into a hopper 22. The valve may be manipulated to change the annular opening discharge space through the valve stem 23. The carrier particles discharged into the hopper flow down through pipe 24 to the inlet of the transfer line 25. The carrier particles are carried up through the transfer line 25 by the burning of fuel gas from line 26 with preheated air from line 27. The thus heated carrier particles at a temperature above the FeO reduction temperature, e.g. at 950° to 1050° C., are discharged into the cyclone separator 28 to be separated from the spent combustion gaseous products which are withdrawn through line 29. The separated hot carrier particles are passed back into the vessel 3 from the separator 28 through line 30 to be dispersed in the upper part of the fines bed 19 in vessel 3. The carrier introduced to the upper part of the fluidized bed 19 should be made to fall evenly distributed through the fines bed and settled into the moving bed at the interface I.

In order to have proper fluidization of the fines in bed 19, settling of the carrier uniformly distributed into the moving bed and nonturbulent downward flow of the moving bed at the interface, the gases are supplied to vessel 3 at a number of points. A portion of the total gas used, termed "primary gas," is passed into the bottom part of the moving bed as through inlets 31 and 32, also inlets 33 and 34. Another portion of the total gas used, called "secondary gas," is passed into the fluidized fines bed 19 through inlets 35 and 36 at points definitely above the interface I to prevent turbulence in the interfacial region.

While the upper part of the moving bed of carrier must be free of turbulence at the interface with the base of the fluidized fines bed, elimination of turbulence at the bottom of the moving bed is not necessary. The separation of the fines from the carrier must be made to occur in a narrow zone at the interface I. For example, in the cone valved controlled discharge of carrier from the bottom of the moving bed, one can admit the primary gas for the moving bed through the annular opening between the cone valve 37 and the wall of vessel 3. In this instance, the gas velocity through this opening is high enough to be above the critical mass velocity of the carrier and cause turbulence at the bottom of the moving bed. However, as the gas rises through the moving bed it becomes distributed across the area of the moving bed, and the gas velocity falls sufficiently to make the moving bed nonturbulent at its upper part so that it has a steady nonsurging top level at the interface I.

A certain amount of carrier should be allowed to accumulate in establishing the moving bed. A minimum carrier accumulation of 15 pounds per square foot is essential. Although more accumulation means a deeper moving bed and more pressure drop through it, it gives a larger factor of safety in distributing the gas and preventing surging in the upper part of the moving bed.

Partly spent reducing gas which rises to the top of the fluidized fines bed 19 in vessel 3 is taken overhead through a fines separator cyclone 38 and line 39. If desired, external cyclone separators may be used. The separated fines are returned to the fluidized bed 19.

The overhead gas from vessel 3 contains a high proportion of reducing components with respect to oxidizing components since the gas composition and rate of flow is purposely controlled to limit the amount of $CO_2$ and $H_2O$ formed in the gases passing through vessel 3. The overhead gas at a high temperature of above 800° C. is passed in part through line 13 as reducing gas for vessel 2. A residual portion of this gas is passed through line 40 to line 50 by which such gas can be used as fuel gas which is passed through line 26 into the transfer line 25. This hot gas may also be passed through a heat exchanger 51 for receiving heat from spent flue gas that is passed through line 29. Excess gas from vessel 3 is drawn off for use elsewhere from line 50 or line 26.

The third stage reduction fines product is withdrawn from the fluidized bed 19 which overflows into a well 52 and is discharged through line 53. This fines product contains a preponderance of Fe, preferably 85 to 95% Fe. These fines may then be briquetted in a reducing gas atmosphere.

With the herein described method of adding heat to the fluidized bed of Fe and FeO fines from heat carrier particles settled down through the bed of fines then efficiently separated from the fines in a lower moving bed and of introducing gas, a number of advantages are obtained. The heat needed to maintain a high reduction temperature through the fines bed is not satisfactorily put in through heat carried into the reduction zone by the reactants, i.e., FeO and the gas, and the indirect heat exchange is inefficient. The heat carrier distributed through the fines bed gives efficient direct heat exchange. A good separation of the heat carrier particles from the fines bed eliminates the need of expensive added separation means. Through the injection of the gas at a plurality of points, e.g., at the bottom of the moving bed and above, a better distribution of gas is obtained with a flexibility in the nature of the gas supplied. For example, in using gaseous hydrocarbon, e.g., methane or natural gas, a substantial amount of the hydrocarbon gas can be supplied through the gas inlets 35 and 36 above the moving bed of heat carrier so that this gaseous hydrocarbon does not undergo cracking in passing up through the moving bed. Simultaneously, some of the gaseous hydrocarbon can be supplied below the moving bed as through inlets 33 and 34 with regulated amounts of steam and/or air to obtain a controlled amount of generation of CO and $H_2$ from the gaseous hydrocarbon that is passed up through the moving bed of heat carrier at a temperature in the range of about 850° to 950° C.

The heat carrier particles may be selected to promote catalytically the reaction of gaseous hydrocarbon with steam and/or air and to produce a high quality reducing gas containing mainly hydrogen, and carbon monoxide with low amounts of $CO_2$ and $H_2O$. Increased porosity or increased surface area of the carrier favor catalytic action. For this purpose the carrier particles are activated, e.g. preactivated alumina, alumino-silicates, coke, or carbons. These carriers are supplied as needed, e.g. through line 54. Spent carriers may be removed through line 55. This reforming reaction is endothermic and requires high temperatures above 850° C. The required heat and temperatures are provided by the heat carrier in the moving bed following the use of the heat carrier for supplying heat to the FeO-Fe fines undergoing reduction in the fluidized bed above the moving bed.

Oxygen-containing gas or air is beneficially introduced at the bottom of the moving bed 20 through lines 33 and 34 in an amount to react with coke deposits on the heat-carrier while gaseous hydrocarbon is introduced at higher points from lines 31 and 32 into the moving bed for improved heat distribution where the hydrocarbon enters and reacts. The coke deposits are gasified to oxides of carbon, CO and $CO_2$, and $CO_2$ reacts with C of the coke particles moving downwardly counter to the gases.

Some heat is added to the gas product formed in the moving bed 20 by reaction of $O_2$ with coke deposits at the bottom of the moving bed, but this heat is generally not enough for maintaining the FeO reduction temperature. However, this added heat permits lowering of the carrier recycle rate through the burner 25.

To supplement the combustible coke deposit on the carrier passed through the burner 25, a portion of the off-gas from the reduction stage may be passed by line 26 into the burner 25, or additional fuel, e.g. hydrocarbon or coke may be added from line 56.

From experiments which led to the discovery of the invention involving the settling of carrier down through a fluidized bed of fines, it was found that precautions had to be taken to prevent a concentration of the carrier in the bottom of the fluidized bed to prevent interference of the carrier with the fluidization of the fines. To correct this an adjustment is needed in the velocity of gas passing into the bottom part of the fluidized fines bed and in the coarseness or density of the carrier particles. Furthermore, a carrier that is too coarse gives poor heat transmittal with low dispersion although it settles rapidly through the fines bed. For the purposes of the present invention, in which the coarse carrier is added to the fluidized bed of Fe and FeO fines for heat transfer while the carrier particles settle down through the fines bed, the size of the coarse carrier particles should be at least double the size of the coarsest Fe and FeO fines, preferably 4 to 10 times the size of the coarsest Fe and FeO fines, i.e., the coarsest 10 wt. percent of such fines. This means that in the reduction of FeO fines that are mostly 20 to 200 microns in diameter the alumina carrier particles should be mostly of from 800 to 2000 micron diameter size. If both fines and carrier particles are of uniform size and shape, fluidizing characteristics and separation behavior can be defined in terms of their free falling velocity. However, there is a wide distribution of particle size and shape for the fines which are reacted and undergo attrition although the carrier can be kept at a narrow size distribution and more uniform. In the experimental evaluations of gas velocities and particle size needed in the present process use was made of a characteristic called "critical mass velocity" defined by Miller and Logwinuk in "Ind. Eng. Chem.," 43, 1220 (1950). This is a reproducible property of a given particle mixture with a given gas and at a given pressure. This critical mass velocity is determined as follows:

A mixture of the particles in question is fluidized with gas velocities sufficient to give active dense bed fluidization and the pressure drop through the bed is measured to determine the curve of pressure drop against gas velocity. With good fluidization such that the particles are in turbulent motion, this relationship forms a horizontal line parallel to the gas velocity abscissa, the pressure drop being measured upwardly on the vertical ordinate. When the gas velocity is adequately lowered, the pressure drop plotted against the gas velocity gives an inclined straight line through the origin. The gas velocity at the intersection of the nearly horizontal line and of said inclined line, both extrapolated, indicates the critical mass velocity point. The critical mass velocity is expressed as the mass of gas flow upward per unit of time and per unit cross section area of the bed of specified solids.

At points along the horizontal line, dense bed fluidization occurs but becomes irregular as the critical mass velocity is approached. At points along the inclined line the particles form a stationary bed. The critical mass velocity is not a transition point from stationary to fluidization conditions because the transition goes through unstable transition states. However, effective separation of coarse particles from fluidized fines particles has a definite relation to the critical mass velocity.

For any given mixture of coarse particles and fines, by maintaining the gas velocity through the interface between a downward moving bed of the coarse particles and fluidized fines bed above it the gas velocity through the interface should be close to the critical mass velocity of the gas for the carrier measured in the absence of fines in order to obtain maximum separation of fines with settling of the carrier in a moving bed. If this gas velocity through the interface is above the critical mass velocity of the carrier the carrier or coarse particles are swept upwardly. If this gas velocity is too much below the critical mass velocity with respect to the carrier, fines contamination of the carrier in the moving bed becomes excessive. Thus, one can judge the correct velocity of primary gas moving up through a downwardly moving bed of coarse carrier to obtain desired settling of the coarse particles and separation from fines. This gas velocity through the interface at the top of the moving bed should be just enough below the critical mass velocity to obtain the best separation of fines. With steady flow conditions, 1 to 15% below carrier critical velocity gives best results.

The critical mass velocity of the gas through the top of the carrier moving bed must be greater than that of the gas with respect to the fines per se, and at a ratio thereto as high as compatible with satisfactory heat transfer from the carrier to the fines. When this ratio is less than 10:1 separation is usually too poor. This ratio is preferably in the range of 15:1 to 45:1.

The separation of the coarse heat carrier settled down through a bed of fluidized fines is influenced by the rate of flow of the carrier down into the upper layer of the moving bed of the carrier. If this rate of flow is too high contamination of the carrier by the fines becomes excessive. If the gas velocity is too low through the interface contamination by fines rises rapidly with carrier flow rate increase thus reducing heat exchange benefits. The high flow rate of carrier attainable with low contamination of the moving bed carrier by fines is remarkable when the proper controls are used, as shown by the following data.

Settling fused silica bead carrier of 300 to 400 micron size and for which the critical mass gas velocity is 0.022 lb. per sq. ft. per sec., which at the conditions used was 0.29 ft./sec. through fluidized fines of 20 to 175 micron size into a moving bed of the carrier, when the gas velocity at the interface was 0.23 ft./sec. (79% of critical mass gas velocity), the fines contamination of the carrier withdrawn from the moving bed was 0.2 wt. percent at a carrier flow rate of 2000 lbs./hr./ft.$^2$, 0.10 wt. percent at 10000 lbs./hr./ft.$^2$, 020 wt. percent at 18000 lbs./hr./ft.$^2$ flow rate. At above 26000 lbs./hr./ft.$^2$ flow rate of the carrier through the interface, the contamination rose steeply and separation breaks down. For the settling of the same kind of carrier through the same kind of fines with the gas velocity at 0.17 ft./sec. through the interface (59% of critical mass gas velocity) the fines contamination increased rapidly, being 0.2 wt. percent at 10000 lbs./hr./ft.$^2$ flow rate of carrier into the moving bed and then separation broke down. When the gas velocity was at 0.29 ft./sec. or higher through the interface, the moving bed top was in turbulence and separation broke down.

The heat-carrier may be made of various refractory materials, such as, fused silica, magnesia, sintered alumina, zirconia, chromite, and mixtures or composites of such substances in fused or sintered form.

In using the carriers to mix with Fe and FeO fines of 10 to 750 micron size, the coarsest 10 wt. percent of the fines averaging 150 to 250 microns, and to settle out therefrom into a moving bed which leaves less than 1% contamination by the fines in the moving bed carrier separated as described, the carrier size may be in the range of 300 to 2000 microns, the carrier flow rate into the moving bed may be in the range of 2000 to 25000 lbs./hr./sq. ft., the primary gas velocity up through the interface at the top level of the moving bed 0.2 to 1 ft./sec. and the fluidization gas velocity through the fluidized fines bed generally more than twice that of said primary gas and in the range of 0.5 to 5 ft./sec.

Selection of conditions, kind of carrier, sizes of carrier and fines, flow rates and gas velocities are variable depending on the interdependent characteristics of the materials used, e.g., their sizes and densities, also the rates of flow and gas velocities used for obtaining a desired amount of heat input and reaction.

Examples demonstrating the utility are as follows:

Example 1

In reducing FeO fines (90% 20 to 200 microns) added to fluidized Fe fines at a rate to maintain the mixture at 85% Fe content using natural gas (93% CH$_4$) as primary and secondary gas, a reducing temperature is maintained in the reducing zone at 875° to 900° C. by flowing into a top part of the fluidized Fe—FeO fines bed fused alumina heat-carrier particles of 1000 micron size at a temperature of 1000° C. The flow of the carrier is adjusted to become dispersed in and settle through the fluidized fines then drop into the top of a moving bed of the carrier at a rate of 5000 to 10000 lbs./hr./sq.ft. The settled out carrier is accumulated in the moving bed which is made to have at its top a nonturbulent level interface with the base of the fluidized fines. Natural gas is supplied as primary gas at the bottom of the moving bed to make the gas velocity at the interface 0.2 to 0.5 ft./sec. and adjusted to prevent turbulence in the upper part of the moving bed. Carrier is removed continuously from the bottom of the moving bed to maintain a constant interface level. At above the interface preheated natural gas is introduced as secondary gas into the fluidized fines to make the gas velocity passing up through the fines mixture 1 to 2 ft./sec. With continuous addition of FeO fines and removal of overflow product of fines from the top of the fluidized bed, the Fe content of the fines is kept in the range of 85 to 95 wt. percent with negligible amount of carrier in this product. The withdrawn carrier containing less than 1 wt. percent Fe and FeO fines is reheated in a riser by combustion of coke deposits and recycled at 1000° C. to the upper part of the fluidized fines bed.

Example 2

Using as carrier particles, petroleum coke particles of 500 to 2000 microns size to establish a moving bed subadjacent fluidized Fe and FeO fines, approximately 2.2 parts by volume of air is injected into the bottom of the moving bed for each part by volume of gaseous hydrocarbon (natural gas) passed into an intermediate part of the moving bed of carrier. To provide sufficient contact time, at least 15 lbs. of carrier in the moving bed is contacted with the hydrocarbon feed rate at 1 lb./hr. The hydrocarbon is principally decomposed to hydrogen and coke deposits on the carrier particles. Oxidation of the coke deposits by O$_2$ of the air, adjusted to minimize oxidation of petroleum coke in this zone maintains an average temperature close to 950° C. The gas product rising to the top of the moving bed of carrier and then passing into the adjacent bed of fluidized fines is made under these conditions to contain approximately 33% H$_2$, 40% N$_2$, 19% CO, 7% CH$_4$, with the remainder being higher hydrocarbon and CO$_2$. With selective control of temperature, contact time, ratio of air, injection points, and degree of air preheat, the content of O$_2$, CO$_2$, and H$_2$O is made negligible. Enough gaseous hydrocarbon or reducing gas (e.g. off-gas from the reduction zone) is injected above the moving bed to impart a higher gas velocity for fluidizing fines in the adjacent upper bed. Carrier particles dropping from the bottom of moving bed are passed to a burner zone where petroleum coke or other fuel is burned and the carrier particles are heated to above 950° C. e.g. 1000° C., then are returned into the bed of fluidized fines kept at 90% Fe and 10% FeO in composition by continuously adding FeO fines and withdrawing fines from the bed as reduction of the FeO proceeds. Heat from the carrier distributed into the fines bed and from the reducing gas keeps the fines bed temperature at an average of 900° C. even though the reduction in its net heat of reaction is endothermic. Gaseous hydrocarbon remaining in the gas generated in the moving bed and added above the moving bed enrich the reducing power of the gas by undergoing decomposition in the presence of the Fe and FeO fines.

Liquid hydrocarbon can be atomized into the moving bed to replace part or all of a hydrocarbon gas feed and it becomes decomposed to H$_2$ and coke.

The invention described is claimed as follows:

1. In a process of reducing iron oxides by direct reduction with reducing gases, the improvement which comprises establishing a bed of fluidized Fe and FeO fine particles at an FeO reducing temperature, flowing into said bed coarse heat carrier particles at a temperature higher than the reducing temperature of said bed that are settled dispersed through said bed of fine particles into a top layer of a moving bed of said carrier having a top level interface with the base of said bed of fluidized fine particles, forming in said moving bed a reducing gas which flows upwardly therethrough uniformly distributed and at a velocity below that at which turbulence is created in the top layer of the moving bed to prevent entrapment of fines in the moving bed, discharging carrier particles free of fines from a bottom part of said moving bed to maintain said top level interface, and injecting additional reducing gas into a bottom part of said fluidized fines bed above said interface.

2. In a process of reducing iron oxides by direct reduction with reducing gas, the improvement which comprises adding FeO fine particles to a fluidized bed of Fe fine particles at reduction temperature, distributing and settling coarse heat-carrier particles, which as introduced into said bed are at a higher temperature than said reducing temperature, down through said fluidized bed of said fine particles to impart heat directly thereto, collecting the carrier particles settled through the fluidized bed then out of said fluidized bed as a subadjacent moving bed substantially free of said fines, passing into a bottom part of said moving bed of carrier particles gaseous hydrocarbon and oxidizing gas proportioned to form a reducing gas containing CO and $H_2$ with a minimum of $H_2O$ and of $CO_2$, passing said reducing gas up through the fluidized bed of fines, controlling the settling rate of carrier particles by control of fluidizing gases passing through said fluidized bed, and the upward velocity of reducing gas through the moving bed into the fluidized bed to minimize contamination of the carrier particles settled out of the fluidized bed by the Fe and FeO fines, increasing the upward velocity of reducing gas through the fluidized bed of fines by introducing reducing gas near the bottom of said bed of fines but above a non-turbulent top layer of the moving bed of carrier which makes a non-surging horizontal level interface with the base of the fluidized fines bed, and withdrawing fine particles of Fe from a top part of the fluidized fines bed at a level above that at which the coarse heat-carrier particles are distributed in said fluidized bed of fine particles.

3. In a process of reducing iron oxides, the improvement which comprises adding fine particles of FeO to a fluidized fines bed containing continuously a preponderance of fine Fe particles, fluidizing the fines bed by reducing gas passing up through the fines bed from a subadjacent downwardly moving bed of coarse heat-carrier particles and by reducing gas introduced above the bottom of the fines bed, heating said fines bed to a temperature needed for reduction of the FeO fines by direct heat transfer from coarse heat-carrier particles supplied at higher temperature than said fines bed as said heat-carrier particles gravitate dispersed down through the fines bed then fall separated from the fines into the subadjacent downwardly moving bed of the coarse heat-carrier particles, removing Fe fines from an upper part of the fluidized fines bed where its top level is maintained free of the heat-carrier particles, and withdrawing heat-carrier particles free of Fe and FeO fines from bottom part of the moving bed in maintaining a constant horizontal level interface at the top of the moving bed with the bottom of the fluidized fines bed.

4. A process of reducing $Fe_2O_3$ fines to Fe fines which comprises the steps of reducing the $Fe_2O_3$ to $Fe_3O_4$ in a first stage, reducing the $Fe_3O_4$ to FeO in a second stage, and reducing the FeO to Fe, at a FeO reducing temperature, in a third stage wherein a fluidized bed of the FeO with a major proportion of Fe fines is maintained, supplying heat directly to the fluidized bed of FeO and Fe fines in the third stage by transfer from heat carrier particles, at a temperature higher than the reducing temperature, passed dispersed in the fluidized bed, then separate therefrom, fluidizing the bed of FeO and Fe fines by a reducing gas, passing a portion of partially spent reducing gas from the third stage to the second stage for reducing $Fe_3O_4$ therein, passing another portion of the partially spent reducing gas from the third stage to a combustion zone where heat-carrier particles after passing through the fluidized bed in said stage are reheated, and passing reheated heat-carrier particles, at a higher temperature, from the combustion zone into the fluidized bed of FeO and Fe fines to become the heat-carrier particles dispersed therein.

5. In a process of reducing particles of FeO at its reduction temperature mixed with Fe particles in the presence of gaseous hydrocarbon and $H_2$, the improvement which comprises passing into admixture with said particles forming a fluidized bed in a reducing zone higher-temperature heat-carrier particles that catalytically promote reaction of gaseous hydrocarbon to form $H_2$ at above 850° C., separating the heat-carrier particles from the fluidized bed of FeO and Fe particles remaining in the reducing zone, forming $H_2$ from gaseous hydrocarbon contacted with the separated heat carrier then passing the $H_2$ and remaining gaseous hydrocarbon into the fluidized bed of FeO and Fe particles, heating the heat-carrier particles separated from the Fe and FeO particles to a higher temperature above the reduction temperature by passing the heat-carrier particles thus separated and bearing coke deposits through a combustion zone in which said deposits are burned, and returning the heat-carrier particles thus heated from the combustion zone to the reducing zone.

6. In the process defined by claim 5, said FeO reduction temperature in said reducing zone being in the range of about 800° to 950° C., said heat-carrier particles passing into the fluidized bed having a higher temperature in the range of about 900° to 1000° C.

7. In the process defined by claim 5, said heat-carrier particles separated from the FeO and Fe particles being contacted with gaseous hydrocarbon and oxidizing gas in proportions to form CO and $H_2$ gas in a zone adjacent to the reducing zone, the resulting gas containing gaseous hydrocarbon, CO and $H_2$ being passed up through the reducing zone.

8. In a process of reducing FeO fines in a fluidized fines bed containing mainly Fe fines fluidized by a reducing gas comprising gaseous hydrocarbon and hydrogen at a reduction temperature of about 800° to 950° C., the improvement which comprises partially decomposing gaseous hydrocarbon passed into contact with a moving bed of heat-carrier solids more coarse than said fines and adjacent to said fines bed to form reducing gas comprising hydrogen and to form coke deposits on said carrier solids, passing this formed reducing gas into contact with said fines in the fines bed, passing the carrier solids from said moving bed through a burner zone where said coke deposits are oxidized to gas and the carrier solids are heated to above said reduction temperature, passing the thus heated carrier solids into said fines bed to impart heat to said fines, separating the heat carrier solids from the fines of the fines bed as they are made to pass therefrom into the adjacent moving bed.

9. In a process of reducing iron oxides by direct reduction with reducing gas, the improvement which comprises adding FeO fine particles to a fluidized bed of Fe fine particles at a reducing temperature, in the range of 800 to 950° C., distributing and settling higher temperature coarse heat-carrier particles of a size 4 to 10 times the size of the coarsest Fe and FeO fines at a temperature in the range of about 900 to 1000° C., down through said fluidized bed of said fine particles to impart heat directly thereto, collecting the carrier particles settled through the fluidized bed as a subadjacent moving bed substantially free of said fines, passing into a bottom part of said moving bed of carrier particles gaseous hydrocarbon and oxidizing gas proportioned to form a reducing gas containing CO and $H_2$ with a minimum of $H_2O$ and of $CO_2$, passing said reducing gas up through the fluidized bed of fines, at a velocity of 0.2 to 1 ft./sec., controlling the settling rate of carrier particles and upward velocity of reducing gas through the moving bed into the fluidized bed to minimize contamination of the carrier particles settled out of the fluidized bed by the Fe and FeO fines by control of the velocity of the fluidizing gases passing through said fluidized bed, increasing the upward velocity of reducing gas through the fluidized bed of fines by introducing reducing gas near the bottom of said bed of fines but above a non-turbulent top layer of the moving bed of carrier which makes a non-surging horizontal level interface with the base of the fluidized fines bed, at a velocity of 0.5 to 5 ft./sec., and withdrawing fine particles of Fe from a top part of the fluidized fines bed at a level above that at which the coarse heat-carrier particles are distributed in said fluidized bed of fine particles.

References Cited in the file of this patent

UNITED STATES PATENTS

| | | |
|---|---|---|
| 2,547,685 | Brassert et al. | Apr. 3, 1951 |
| 2,699,986 | Buell et al. | Jan. 18, 1955 |
| 2,711,368 | Lewis | June 21, 1955 |
| 2,774,661 | White | Dec. 18, 1956 |
| 2,877,106 | Aspegren | Mar. 10, 1959 |

FOREIGN PATENTS

| | | |
|---|---|---|
| 582,055 | Great Britain | Nov. 4, 1946 |
| 601,699 | Canada | Apr. 20, 1954 |